UNITED STATES PATENT OFFICE.

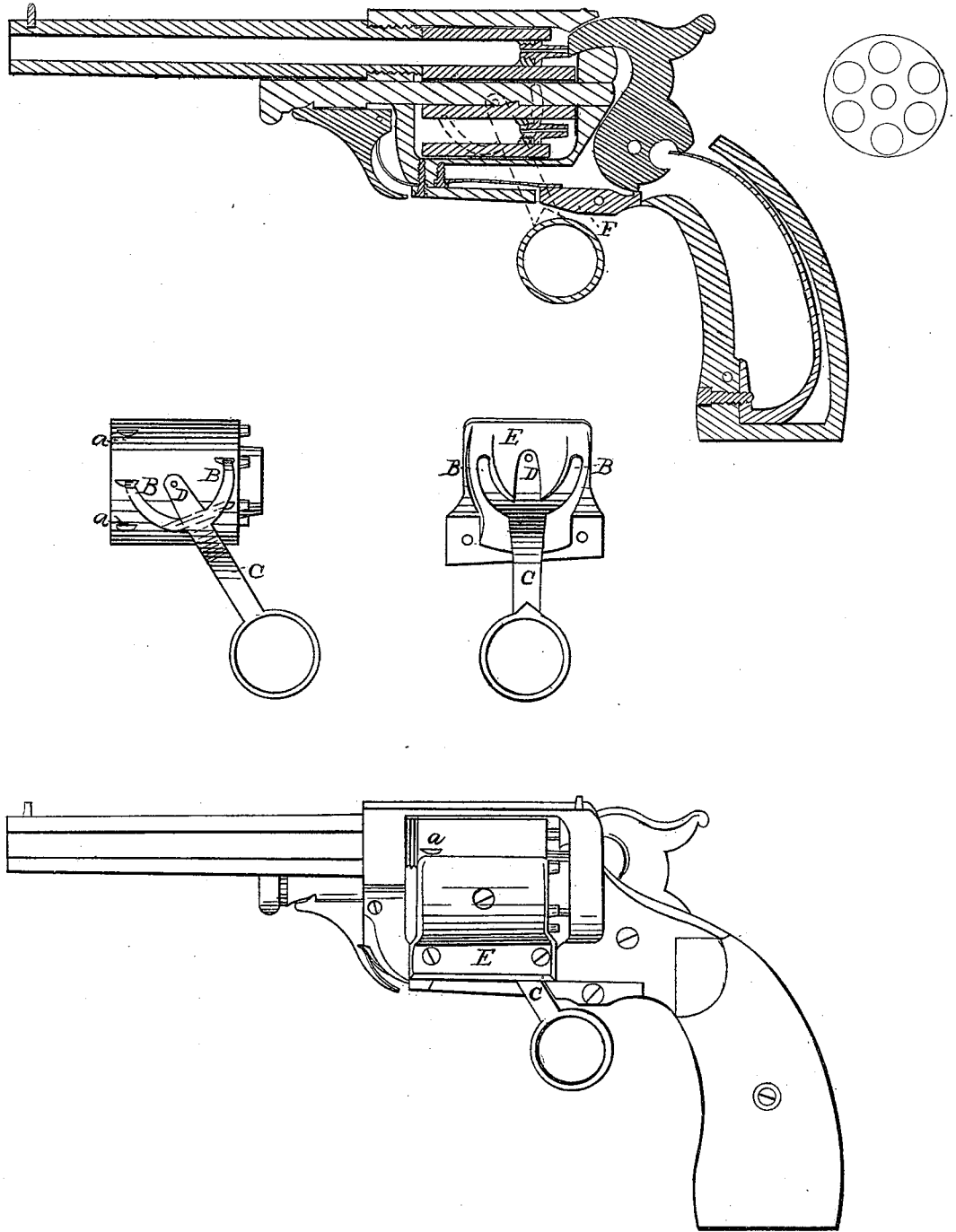

FORDYCE BEALS, OF NEW HAVEN, CONNECTICUT.

IMPROVEMENT IN FIRE-ARMS.

Specification forming part of Letters Patent No. 11,715, dated September 26, 1854.

*To all whom it may concern:*

Be it known that I, FORDYCE BEALS, of New Haven, in the county of New Haven and State of Connecticut, have invented a new and Improved Mode of Rotating the Chambered Breech or Cylinder of a Repeating Fire-Arm; and I do hereby declare that the following is a full and exact description thereof, reference being had to the accompanying drawings, and to the letters of reference marked thereon.

The nature of my invention consists in operating or rotating the chambered breech or cylinder of a repeating fire-arm by means of a lever-trigger working on side surface of chambered breech or cylinder at or near the ends of its large diameter, either vertically, horizontally, or at any degree of angle that may be desired.

To enable others skilled in the art to make and use my invention, I will proceed to describe its construction and operation.

I construct my repeating fire-arm in any of the known forms as to length or thickness, size of caliber, or number of chambers in cylinder, and any other appendages usually connected with rotating fire-arms; but to rotate the chambered breech or cylinder I use a double ratchet formed by making cavities near the ends of large diameter of cylinder, as shown at *a a* in the accompanying drawings, into which the catches or pawls, as shown at B B, are allowed to fall, either by their own elasticity or by the influence of a separate spring, they being connected with or a part of lever-trigger C, its center of motion being on, or nearly on, a right line with ends of pawls, as shown at D, being there connected by its pivot and a screw to the curved plate E, as shown in the accompanying drawings, said curved plate answering the double purpose of facilitating the replacing and adjusting of cylinder, and also of holding lever-trigger C in its right position, thus enabling the operator by a forward-and-backward movement of lever-trigger (which may be done in part by a spring or wholly by the operator without its aid) to rotate the chambered breech or cylinder, the catches or pawls B B operating alternately in the ratchets at its forward and rear end, thus bringing successively the several chambers of cylinders in a line with caliber of barrel, and at the same time the trigger is brought to act upon the sear part at its limit backward, as shown at F, thus releasing the hammer and producing a discharge.

What I claim as my invention, and desire to secure by Letters Patent, is—

The rotating of chambered breech or cylinder by means of a double ratchet, producing rotation by both forward and backward movement of trigger-lever acting on side surface of large diameter of cylinder, as herein described, using for the purpose pawls and ratchets, or any other contrivance substantially the same and producing the same effect.

FORDYCE BEALS.

In presence of—
R. P. BEALS,
CHAS. IVES.